United States Patent [19]

Lee et al.

[11] Patent Number: 5,567,404
[45] Date of Patent: Oct. 22, 1996

[54] PROCESS FOR PREPARATION OF LAYERED SODIUM SILICATE FROM ANHYDROUS SODIUM SILICATE

[75] Inventors: Jung-Min Lee; Jeong-Kwon Suh; Soon-Yong Jeong, all of Taejon; Chun-Hee Park, Seoul; Jeong-Hwan Park, Taejon, all of Rep. of Korea

[73] Assignee: Korea Research Institute of Chemical Technology, Taejon, Rep. of Korea

[21] Appl. No.: 299,432

[22] Filed: Sep. 1, 1994

[30] Foreign Application Priority Data

May 31, 1994 [KR] Rep. of Korea ............... 94-12365

[51] Int. Cl.$^6$ .................................................. C01B 33/32
[52] U.S. Cl. .................................... 423/332; 423/333
[58] Field of Search ............................... 423/333, 332

[56] References Cited

U.S. PATENT DOCUMENTS

| | | | |
|---|---|---|---|
| 4,585,642 | 4/1986 | Rieck | 423/333 |
| 5,183,651 | 2/1993 | Schimmel et al. | 423/332 |
| 5,211,930 | 5/1993 | Schimmel et al. | 423/332 |
| 5,236,681 | 8/1993 | Chu et al. | 423/332 |
| 5,236,682 | 8/1993 | Schimmel et al. | 423/332 |
| 5,268,156 | 12/1993 | Schimmel et al. | 423/333 |
| 5,283,043 | 2/1994 | Johnson et al. | 423/332 |

FOREIGN PATENT DOCUMENTS

| | | |
|---|---|---|
| 0293640 | 12/1988 | European Pat. Off. |
| 3-93649 | 4/1991 | Japan |
| 4-238809 | 8/1992 | Japan |

*Primary Examiner*—Gary P. Straub
*Assistant Examiner*—Stuart L. Hendrickson
*Attorney, Agent, or Firm*—Finnegan, Henderson, Farabow, Garrett & Dunner, L.L.P.

[57] ABSTRACT

An improved layered sodium silicate having a δ crystalline structure and a process for preparing it is described. By pulverizing anhydrous sodium silicate into an anhydrous sodium silicate powder, adding a limited mount of water to form a mixture granulating the mixture, and directly calcining the granules, a layered sodium silicate having improved calcium ion binding capacity and magnesium ion binding capacity can be produced.

10 Claims, 1 Drawing Sheet

PROCESS FOR PREPARATION OF LAYERED SODIUM SILICATE FROM ANHYDROUS SODIUM SILICATE

TECHNICAL FIELD

The present invention relates to a process for preparing layered sodium silicate from anhydrous sodium silicate(cullet), and more particularly, relates to an improved process for preparing layered sodium silicate by adding suitable amount of water directly to anhydrous sodium silicate powder, mixing and granulating them to give water-containing sodium silicate, and by calcining the resulting granules to give layered sodium silicate. As a result, in comparision with the prior processes, purity of the product is increased, processes for preparation are simplified, consumption of energy is reduced remarkably, whereby cost of the product is reduced and also deposition of reactant in an apparatus is improved.

BACKGROUND OF THE INVENTION

Figure 1:
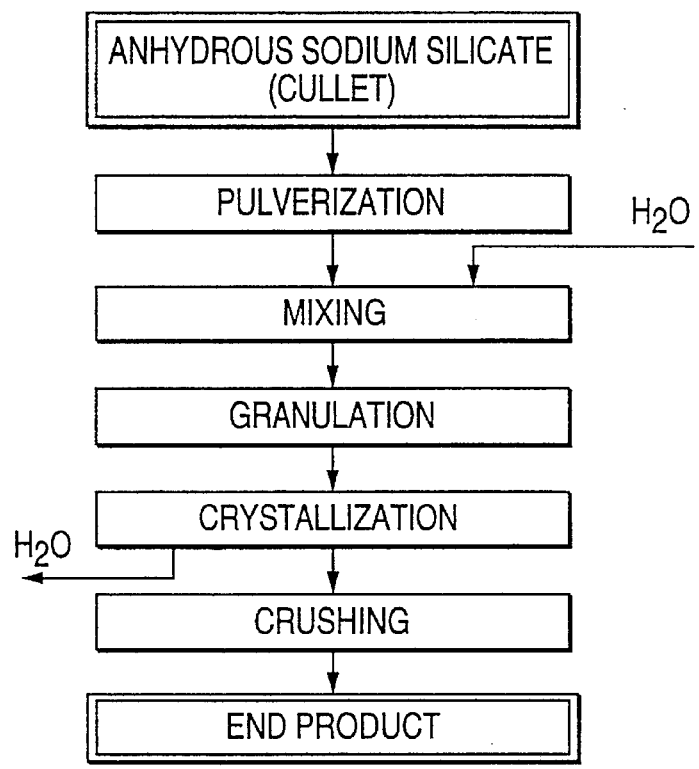
FIG. 1 is a flow diagram for preparation of layered sodium silicate in accordance with the present invention.
Figure 2:
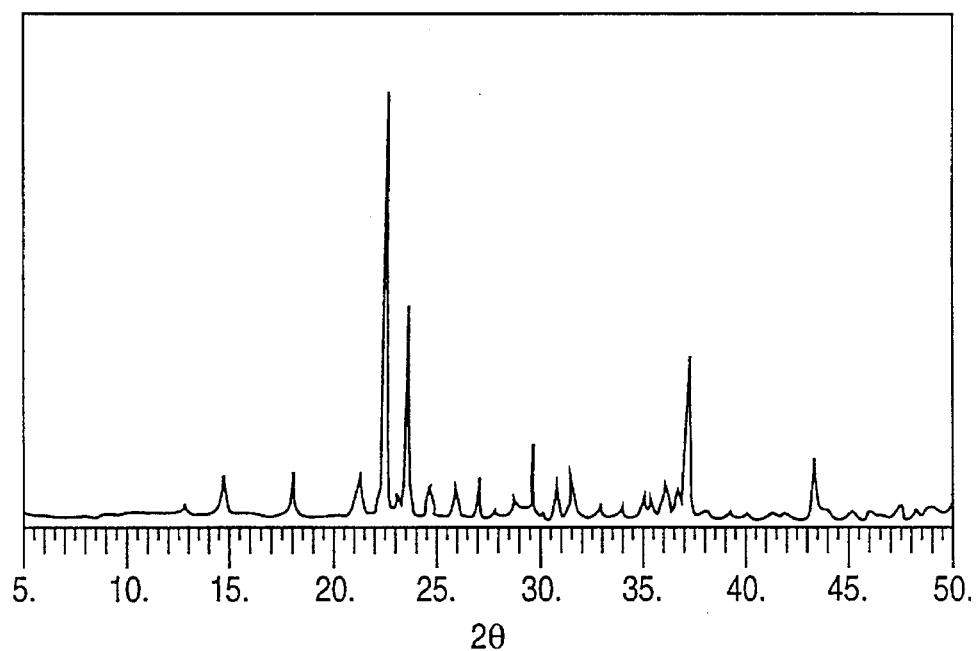
FIG. 2 is a X-ray diffraction pattern of layered sodium silicate synthesized by process of the present invention.

In the conventional industrial processes, the layered sodium silicate is prepared by dissolving anhydrous sodium silicate in water under pressure to give aqueous sodium silicate solution, by spray-dehydrating it to amorphous water-containing sodium silicate powder and then by calcining the resulting compound. According to this prior art, purtiy of the final product is high, but there are many defects as follows:

In processes dissolving anhydrous sodium silicate in water under pressure and dehydrating said aqueous solution to give amorphous water-containing sodium silicate, enormous energy is consumed. And further, since the resulting amorphous water-containing sodium silicate has very low bulk density, its crystallization device should has much greater capacity. Also the reactant is deposited in the reacting apparatus and the dust is generated during the process.

While a process for converting anhydrous sodium silicate into layered sodium silicate directly is the lowest in cost of production of the conventional processes, various types of layered sodium silicates are produced and coexist as impurities, therefore, purity of the final product is low, and continuous processing is not possible due to sudden sintering between particles. Accordingly, said conventional process cannot be utilized as an industrial process.

SUMMARY OF THE INVENTION

The present invention is characterized by using water-containing sodium silicate prepared by adding water to anhydrous sodium silicate. Accordingly, in comparision with the conventional processes, energy cost and troubles in preparation can be reduced, thus processes for preparation can be advanced continuously and properties of the final product can be improved homogenously.

The present invention is to provide a process for preparation of layered sodium silicate for use as ion exchangers, adsorbents, catalyst supports, more particularly, aids for detergents.

DETAILED DESCRIPTION OF THE INVENTION

The layered sodium silicate is represented by the following formula;

$$(Na_2O)x \; (SiO_2)y \tag{1}$$

Wherein the ratio of y to x, y/x depends on the crystal structure, and has values of about 2–11.

Said layered sodium silicate not only can be used as catalyst supports, but also has various uses in chemical processes such as separation and refining processes and the like, since it represents unique adsorption property and ion-exchange capacity in virtue of structural characteristics.

More particularly, since layered sodium disilicate with a molar ratio of $SiO_2/Na_2O$ of 2:1 has high binding capacity with hardness constituents in water, it has been developed as aids for detergents recently.

Until now, zeolite 4A, which have been highlighted as substitutes for aid of phosphates(STPP) causing eutrophication in water, is excellent in exchange capacity for calcium ion but is bad in that for magnesium ion, since magnesium ion forms hydrated cell and it can not be penetrated by the pores of zeolite 4A. In order to improve said defects, sequestering agents for magnesium ion such as X-type zeolite have been added during blending detergents. But they are not only very expensive but also have many difficulties in having homogeneous properties in end product because of processes such as powder blending and the like.

It has been reported that recently $\delta$-$Na_2Si_2O_5$ being synthesized industrially is more excellent than other types of $Na_2Si_2O_5$ in calcium and magnesium ion-exchange capacity.

Typical processes for synthesis of $\delta$-$Na_2Si_2O_5$ were disclosed in U.S. Pat. No. 4,585,642 and European patent No. 293,640 and the like, wherein the process comprises adjusting a molar ratio of $SiO_2$:$Na_2O$ to 1.9:1 through 2.5:1 using aqueous solutions of sodium silicate and sodium hydroxide, dehydrating the mixed solution using a spray-dryer, and then crystallizing said dehydrated material at a temperature of 550°–800° C.

In the above-mentioned process, aqueous sodium silicate solution being more expensive than anhydrous sodium silicate per unit price is used, furthermore, enormous energy is consumed to remove a large amount of moisture from aqueous sodium silicate solution, and also since said dehydrated sodium silicate has very large volume, the size of crystallization device should be enlarged, and the dust generated during the process causes a bag filter to be heavily loaded.

Furthermore, in early stage of crystallization in said process, foaming phenomenon takes place severely because of escape of the residual moisture, and is followed by sintering and contracting between particles, whereby the resulting reactants are deposited inside the crystallization device and after all it is difficult to carry out the process continuously.

Japanese laid open patent No. Hei sei 4-238809 discloses that aqueous sodium silicate solution with a molar ratio of $SiO_2/Na_2O$ of 1.9:1 through 3.2:1 is introduced directly into heating section keeping 680° to 830° C. of temperature range for crystallization. As a result, the process for preparation is simplified.

In said process, however, energy is consumed excessively because of generation of a large amount of vapor in the dehydrating process at high temperature, crystallization device corrodes easily and there is a problem that the reactant is deposited inside the apparatus when sudden shut-down.

Korean laid open patent publication No. 92-14308 discloses that anhydrous sodium silicate prepared from sand and soda ash is pulverized and calcined to give crystalline sodium silicate. In this process, however, impurities such as α, β-$Na_2Si_2O_5$ exist in end product in a large amount and continuous processing is impossible because of sudden sintering phenomenon.

Japanese laid open patent No. Hei sei 3-93649 discloses that anhydrous sodium silicate is prepared by adding part of an alumina constituent for improving water-resistance, is pulverized and crytallized to improve layer-like structure.

In this process, also a large amount of impurities are mixed and particles are sintered each other.

In comparision with the conventional industrial process in which all amount of water glass is heated and dehydrated using a spray-dryer in order to convert it into amorphous water-containing sodium silicate, and then is calcined to give layered sodium silicate, the process according to the present invention can make low cost of production eventually because expense for energy being consumed during dehydration can be economized remarkably by using water-containing sodium silicate prepared by addition of a process of blending suitable amount of water to anhydrous sodium silicate powder.

Furthermore, in comparision with the conventional process in which anhydrous sodium silicate are pulverized to give directly layered sodium silicate, according to the process of the present invention, sintering between particles is inhibited, ion-exchange capacity of end product is excellent, production of various types of layered sodium silicate is inhibited and layered sodium silicate composed mainly of δ-$Na_2Si_2O_5$ and having homogeneous properties can be obtained.

The present invention now will be described in more detail below.

Anhydrous sodium silicate ($SiO_2/Na_2O$=1.8:1~2.2:1) is first pulverized to give powder having the largest particle size of 185 μm or less, 5.0 to 30.0% by weight of water is added thereto, and the resulting mixture is mixed sufficiently, then is introduced into a drum type granulator and is granulated to give 1 to 50 mm size of granules.

The granulators can be selected from pan types, extruder types, fluidized bed types, tableting types, roll press types and cone pelletizer types including the above-mentioned drum type granulators. The resulting water-containing sodium silicate granules are introduced into a rotary kiln, a calcination device, are calcined at 650° to 770° C. for 0.3 to 3.0 hours, are crushed to give crystalline layered sodium silicate which has calcium ion exchange capacity of not less than 78.0 mg $Ca^{2+}$/g and magnesium ion exchange capacity of not less than 65.0 mg $Mg^{2+}$/g, at 25° C., respectively, and is almost composed of δ-$Na_2Si_2O_5$.

According to the present invention, energy expense is reduced, purity of the end product is improved, sintering between particles and deposition of the reactants inside the crystallization device can be improved.

The calcination devices can be selected from batch type kilns, tunnel type kilns, microwave heating type kilns and Herreshoff kilns including the above-mentioned rotary kilns.

Atmosphere of the above-stated calcination kilns can be any one selected from $N_2$ gas, $O_2$ gas and steam atmospheres including ambient atmosphere.

The invention is illustrated in more detail by the following examples.

EXAMPLE 1

1200 g of anhydrous sodium silicate with a molar ratio of $SiO_2$:$Na_2O$ of 2.03:1 was pulverized to the largest particle size of 185 μm or less, and then was divided into six groups of 200 g each. Distilled water of 5,10,15,20,25 and 30% by weight was added to each group respectively and each of them was mixed sufficiently. The mixed samples were introduced into drum type granulator, respectively, the apparatus was operated in rate of 90 rpm for 0.5 hours to give 1 to 50 mm sizes of particles.

The granulated water-containing sodium silicate was introduced into rotary calcination kilns, and calcined at about 725° C. under ambient atmosphere for 1.0 hour, and then was cooled to ambient temperature. Sample was picked, randomly from the cooled sodium silicate, crushing strength of the end product was measured with a grain crushing tester. After they were crushed to particle sizes of 104 μm or less, calcium and magnesium ion exchange capacities were measured.

Properties of the resulting samples are shown in Table 1.

Comparision Example 1

Example 1 was repeated with the modification that water was not added to anhydrous sodium silicate powder. Also properties of the resulting product were measured by the same method as Example 1.

Properties of the resulting samples are shown as Comparision Example 1 below Example 1 in Table 1.

TABLE 1

| Sample No. | Quantity of water to add (wt. %) | $Ca^{2+}$* exchanged quantity (mg$Ca^{2+}$/g) | $Mg^{2+}$* exchanged quantity (mg$Mg^{2+}$/g) | X-ray Diffraction | Deposit in crystallization device (Existence, Nil) | Crushing strength of products(N) |
|---|---|---|---|---|---|---|
| Example 1 | | | | | | |
| 1-1 | 5.0 | 86.2 | 72.3 | Mainly, δ-$Na_2Si_2O_5$, partially, β-$Na_2Si_2O_5$ | Nil | 120 |
| 1-2 | 10.0 | 93.6 | 75.2 | Mainly, δ-$Na_2Si_2O_5$, partially, β-$Na_2Si_2O_5$ | Nil | 82 |
| 1-3 | 15.0 | 96.8 | 76.8 | δ-$Na_2Si_2O_5$ crystalline | Nil | 54 |
| 1-4 | 20.0 | 97.3 | 76.7 | δ-$Na_2Si_2O_5$ crystalline | Nil | 35 |

TABLE 1-continued

| Sample No. | Quantity of water to add (wt. %) | Ca²⁺* exchanged quantity (mgCa²⁺/g) | Mg²⁺* exchanged quantity (mgMg²⁺/g) | X-ray Diffraction | Deposit in crystalliza- tion device (Existence, Nil) | Crushing strength of products(N) |
|---|---|---|---|---|---|---|
| 1-5 | 25.0 | 97.6 | 76.9 | $\delta$-$Na_2Si_2O_5$ crystalline | Nil | 23 |
| 1-6 | 30.0 | 97.5 | 76.9 | $\delta$-$Na_2Si_2O_5$ crystalline | Nil | 23 |
| Comparison Example 1 | | | | | | |
| 1-1 | 0 | 65.7 | 56.5 | Mixture of $\alpha, \beta, \delta,$ - $Na_2Si_2O_5$ | Existence | 170 |

*Ion exchange temperature: 25° C.

EXAMPLE 2

Example 1 was repeated with the modification that anhydrous sodium silicate was pulverized to the largest particle size of 74 μm or less.

Properties of prepared samples were measured, and results are shown in Table 2.

Comparision Example 2

Example 2 was repeated with the modification that water was not added to anhydrous sodium silicate powder. Properties of the obtained end product are shown as Comparision Example 2 below Example 2 in Table 2.

TABLE 2

| Sample No. | Quantity of water to add (wt. %) | Ca²⁺* exchanged quantity (mgCa²⁺/g) | Mg²⁺* exchanged quantity (mgMg²⁺/g) | X-ray Diffraction | Deposit in crystalliza- tion device (Existence, Nil) | Crushing strength of products(N) |
|---|---|---|---|---|---|---|
| Example 2 | | | | | | |
| 2-1 | 5.0 | 87.5 | 73.5 | Mainly, $\delta$ - $Na_2Si_2O_5$, partially, $\beta$ - $Na_2Si_2O_5$ | Nil | 116 |
| 2-2 | 10.0 | 95.7 | 76.1 | Mainly, $\delta$ - $Na_2Si_2O_5$, partially, $\beta$ - $Na_2Si_2O_5$ | Nil | 80 |
| 2-3 | 15.0 | 97.2 | 76.5 | $\delta$-$Na_2Si_2O_5$ crystalline | Nil | 52 |
| 2-4 | 20.0 | 97.5 | 76.8 | $\delta$-$Na_2Si_2O_5$ crystalline | Nil | 34 |
| 2-5 | 25.0 | 97.5 | 76.7 | $\delta$-$Na_2Si_2O_5$ crystalline | Nil | 22 |
| 2-6 | 30.0 | 97.6 | 76.9 | $\delta$-$Na_2Si_2O_5$ crystalline | Nil | 23 |
| Comparison Example 2 | | | | | | |
| 2-1 | 0 | 66.8 | 56.7 | Mixture of $\alpha, \beta, \delta,$ - $Na_2Si_2O_5$ | Existence | 164 |

*Ion exchange temperature: 25° C.

It is claimed:

1. A process for preparing layered sodium silicate having crystalline structure comprising:

pulverizing anhydrous sodium silicate having a molar ratio of $SiO_2$ to $Na_2O$ of 1.8:1 to 2.2:1 into anhydrous sodium silicate powder having a particle size of 185 μm or less;

adding water in an amount of 10.0 to 20.0 wt % to said powder to form a mixture;

granulating the mixture to form granules having a size of 1 to 50 mm; and directly calcining the granules at 650° C. to 770° C. for 1 to 2 hours.

2. The process as claimed in claim 1, wherein said anhydrous sodium silicate is pulverized so that the size of the largest particle in the powder is 74 μm or less.

3. The process as claimed in claim 1, wherein the mixture is granulated to form granules having a size of 3 to 30 mm.

4. A layered sodium silicate having a $\delta$ crystalline structure prepared by a process comprising:

pulverizing green anhydrous sodium silicate having a molar rate of $SiO_2$ to $Na_2O$ of 1.8:1 to 2.2:1 into anhydrous sodium silicate powder having a particle size of 185 μm or less;

adding water in an amount of 10.0 to 30.0 wt % to said powder to form a mixture;

granulating the mixture to form granules having a size of 1 to 50 mm;

directly calcining the granules at 650° C. to 770° C. for 1 to 2 hours;

said layered sodium silicate having a calcium ion binding capacity greater than 87.0 mg $Ca^{2+}$/g; and a magnesium ion binding capacity greater than 73.0 mg $Mg^{2+}$/g at 25° C.

5. A process for preparing layered sodium silicate having crystalline structure comprising:

pulverizing green anhydrous sodium silicate having a molar ratio of $SiO_2$ to $Na_2O$ of 1.8:1 to 2.2:1 into anhydrous sodium silicate powder having a particle size of 185 μm or less;

adding water in an amount of 10.0 to 30.0 wt % to said powder to form a mixture;

granulating the mixture to form granules having a size of 1 to 50 mm; and directly calcining the granules at 650° C. to 770° C. for 1 to 2 hours.

6. The process as claimed in claim 5, wherein said green anhydrous sodium silicate is pulverized so that the size of the largest particle in the powder is 74 μm or less.

7. The process as claimed in claim 5, wherein water in an amount of 10.0 to 20.0 wt % by weight is added to said anhydrous sodium silicate powder.

8. The process as claimed in claim 1, wherein the mixture is granulated to form granules having a size of 3 to 30 mm.

9. A layered sodium silicate having a δ crystalline structure, said layered sodium silicate having a calcium ion binding capacity greater than 87.0 mg $Ca^{2+}$/g and a magnesium ion binding capacity greater than 73.0 mg $Mg^{2+}$/g at 25° C.

10. The layered sodium silicate of claim 9 wherein said layered sodium silicate has a calcium ion binding capacity greater than 93 mg $Ca^{2+}$/g.

\* \* \* \* \*

UNITED STATES PATENT AND TRADEMARK OFFICE
CERTIFICATE OF CORRECTION

PATENT NO. : 5,567,404
DATED : October 22, 1996
INVENTORS : Jung-Min LEE et al.

It is certified that error appears in the above-identified patent and that said Letters Patent is hereby corrected as shown below:

In the Abstract:
　　Line 5, change "mount" to --amount--.

Signed and Sealed this

Fourth Day of February, 1997

Attest:

BRUCE LEHMAN

Attesting Officer　　　　Commissioner of Patents and Trademarks